United States Patent
Tien

(10) Patent No.: US 7,413,045 B2
(45) Date of Patent: Aug. 19, 2008

(54) BATTERY QUICK-RELEASE STRUCTURE FOR AN ELECTRIC MOBILITY SCOOTER

(75) Inventor: Cheng-Jy Tien, Chiayi Hsien (TW)

(73) Assignee: Karma Medical Products Co., Ltd., Chiayi Hsien (TW)

( * ) Notice: Subject to any disclaimer, the term of this patent is extended or adjusted under 35 U.S.C. 154(b) by 477 days.

(21) Appl. No.: 11/289,586

(22) Filed: Nov. 30, 2005

(65) Prior Publication Data

US 2007/0119641 A1    May 31, 2007

(51) Int. Cl.
*B60R 16/04* (2006.01)
(52) U.S. Cl. .................. 180/68.5; 903/907; 429/96; 429/100
(58) Field of Classification Search ............. 180/68.5; 903/907; 429/96, 97, 98, 99, 100
See application file for complete search history.

(56) References Cited

U.S. PATENT DOCUMENTS

| | | | | |
|---|---|---|---|---|
| 4,125,305 A * | 11/1978 | Kasindorf | ............... | 312/332.1 |
| 4,435,486 A * | 3/1984 | Pomaro et al. | ............... | 429/1 |
| 5,434,494 A * | 7/1995 | Perego | ............... | 320/111 |
| 5,937,623 A * | 8/1999 | Wolf | ............... | 56/11.9 |
| 6,035,561 A * | 3/2000 | Paytas et al. | ............... | 37/246 |
| 6,415,881 B1 * | 7/2002 | Tsai | ............... | 180/68.5 |
| 7,174,983 B1 * | 2/2007 | Hsiao | ............... | 180/208 |
| 2001/0013437 A1 * | 8/2001 | Husted et al. | ............... | 180/65.1 |
| 2003/0122332 A1 * | 7/2003 | Engels et al. | ............... | 280/47.38 |
| 2006/0070780 A1 * | 4/2006 | Lin | ............... | 180/68.5 |
| 2007/0107963 A1 * | 5/2007 | Chiu | ............... | 180/68.5 |

* cited by examiner

*Primary Examiner*—Christopher Ellis
*Assistant Examiner*—John D Walters
(74) *Attorney, Agent, or Firm*—Rosenberg, Klein & Lee

(57) ABSTRACT

A battery quick-release structure for an electric mobility scooter includes a chassis, a battery case, hasps, retainers, connection rods, a handle, and elastic members. The battery case is mounted on the chassis. The retainers are disposed on the chassis. The battery case is provided with the hasps. The hasps are pivotally connected to the connection rods. The connection rods are connected to the handle. Both ends of each elastic member are respectively connected to the hasp and the battery case. The hasps are normally locked to the retainers. The battery case is released for portability by pulling up the handle for the connection rods are to free the hasps from the retainers.

6 Claims, 5 Drawing Sheets

BATTERY QUICK-RELEASE STRUCTURE FOR AN ELECTRIC MOBILITY SCOOTER

BACKGROUND OF THE INVENTION (a) Field of the Invention

The present invention relates to a battery quick-release structure for an electric mobility scooter, and more particularly, to one that has a battery case pivoted with hasps to be automatically locked to a chassis and can be easily picked up by pulling up a handle to release the hasps.

(b) Description of the Prior Art

For a battery as a must to electric mobility scooters generally available in the market, it rests on a chassis simply by its weight and is fastened to the chassis with a locking bracket. It prevents easy assembly and disassembly and practically a torture to a driver who is handicapped or senile citizen.

A quick-release mechanism of the prior art also takes advantage of the weight of the battery to snap a battery case into the chassis. However, the battery case is not secured to run the risk of safety concerns as it could easily fall out of the chassis when driving on a bumpy road.

SUMMARY OF THE INVENTION

The primary purpose of the present invention is to provide a quick-release structure for a battery case in an electric mobility scooter that overcomes the shortcomings found with the prior art and achieves easy and safe operation by locking the battery case to chassis and allowing it to be picked up simply by pulling up a handle.

According to an aspect of the present invention, there is provided a battery quick-release structure for an electric mobility scooter comprising a chassis, a support unit, a battery case, hasps, retainers, connection rods, a handle, and elastic members; the support unit being fixedly connected to the chassis and comprising a lever and bracket rods, the bracket rods holding the edge of the battery case, the lever stretching over and being fixed to the chassis, the retainers being disposed on the lever, the battery case being disposed with a slot to engage with the lever, the hasp made in curved shape being pivotally connected to the battery case, a first end of the hasp being a hook portion having an outer slope in relation to the retainer, a second end of the hasp being pivotally connected to a first end of the connection rod, a second end of the connection rod being connected to the handle, both ends of the elastic member being respectively connected to the second end of the hasp and the battery case.

Wherein the second end of the connection rod is disposed with a slide pin to connect to the handle.

Wherein hasp holders further extend from both sides of the battery case to rest on the bracket rods of the support unit.

Wherein a guide plate is further fixed to the hasp holder; a chute being disposed on the guide plate; and a slide pin being disposed on the second end of the connection rod, the slide pin penetrating through the chute.

The present invention provides the following advantages:
1. Easy operation. Simply grab the handle of the battery case to put it down or pull it up.
2. Safe operation. The battery case is secured in place without shaking up and down when the scooter is on the road.

DETAILED DESCRIPTION OF THE PREFERRED EMBODIMENTS

Figure 1:
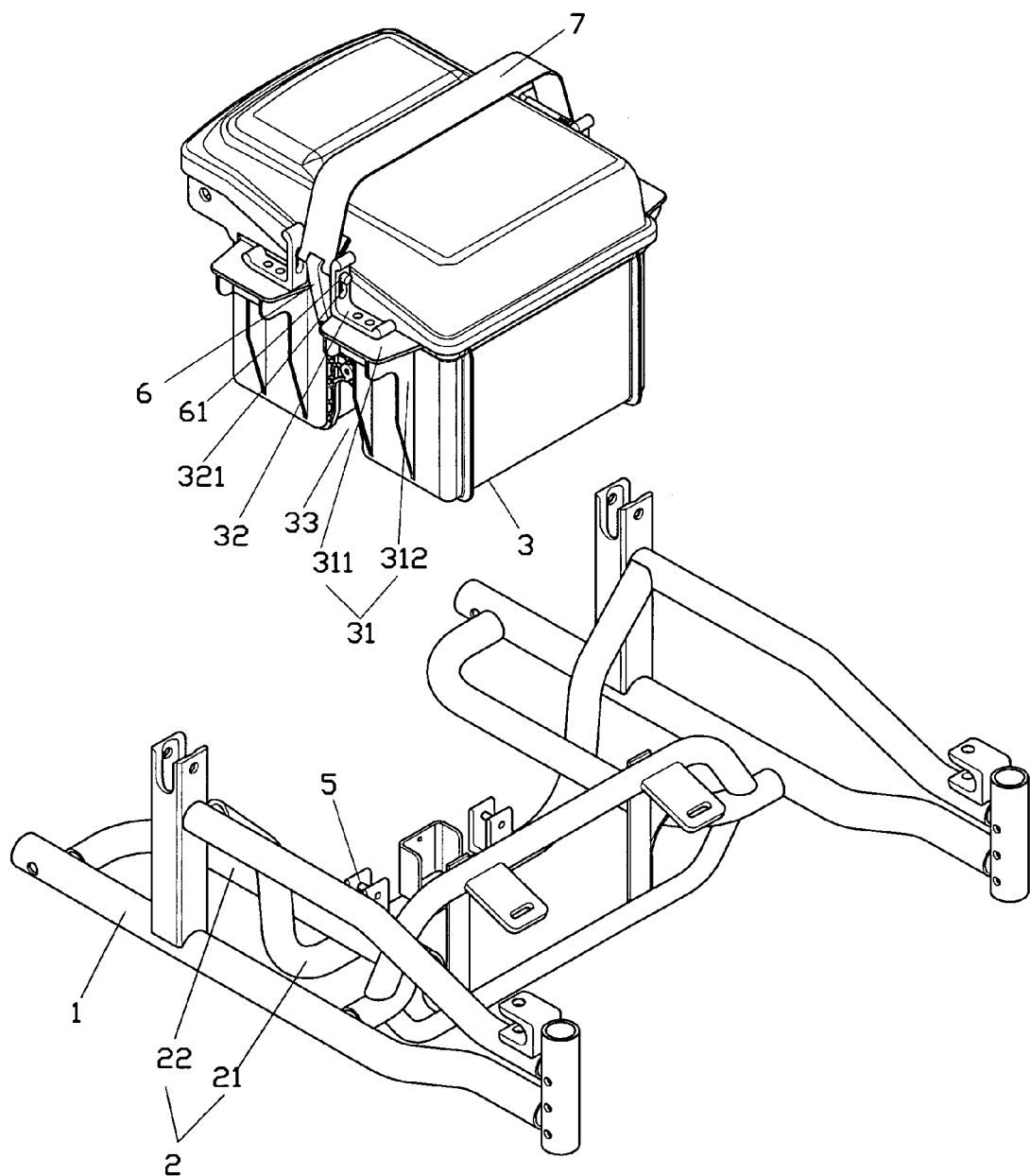
FIG. 1 is a perspective view of a preferred embodiment of the present invention.
Figure 2:
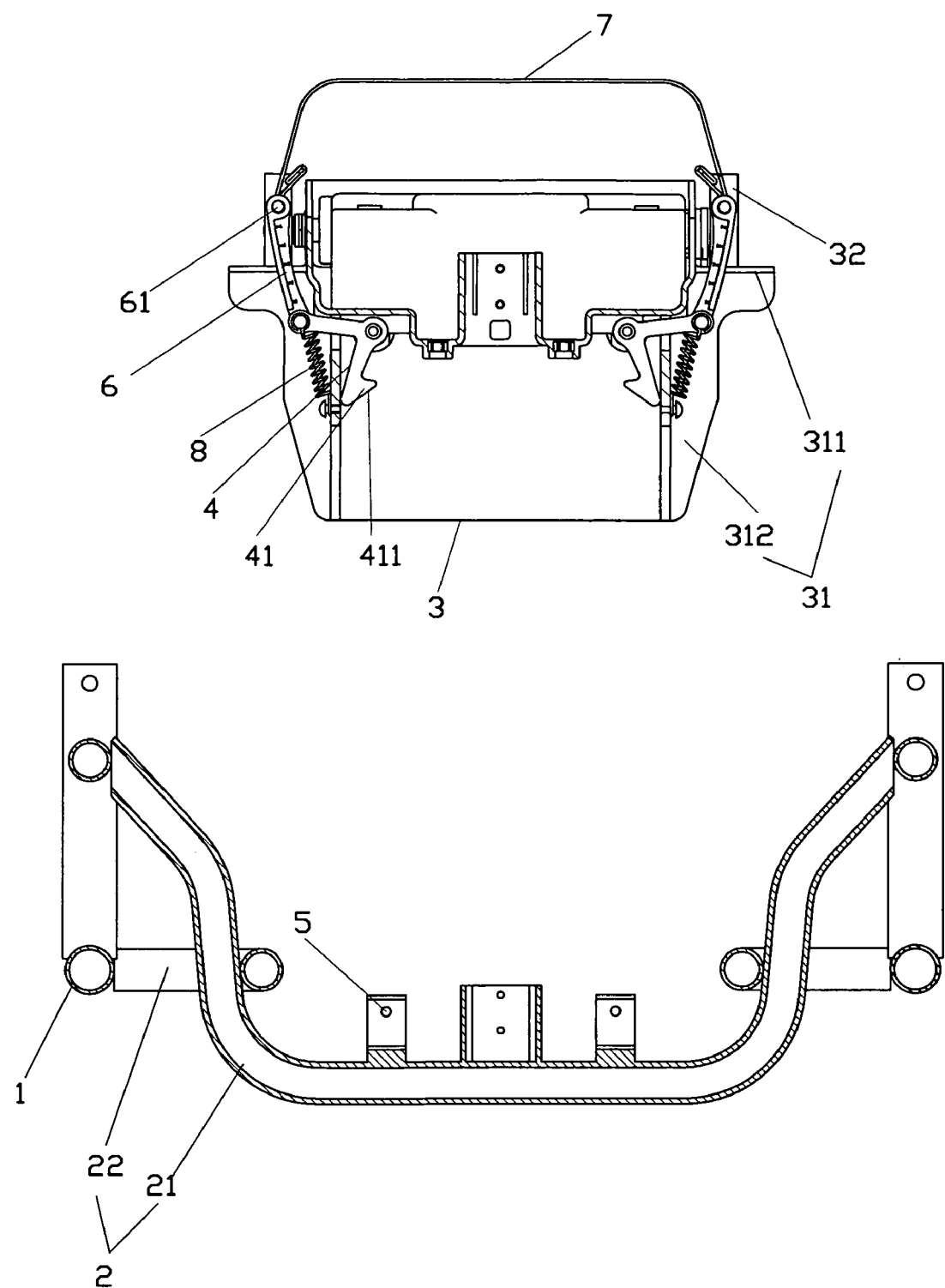
FIG. 2 is a side sectional view of the preferred embodiment of the present invention before assembly.

Referring to FIGS. 1 and 2, a preferred embodiment of the present invention includes a chassis (1), a support unit (2), a battery case (3), hasps (4), retainers (5), connection rods (6), a handle (7), and elastic members (8). The support unit (2) is pivotally connected to the chassis (1). The support unit (2) includes a lever (21) and a pair of bracket rods (22). The bracket rods (22) hold the edge of the battery box (3). Hasp holders (31) are further provided on both sides of the battery case (3) to rest on the bracket rods (22) of the support unit (2). Each hasp holder (31) comprises a flap (311) and upstanding ribbed plates (312). The ribbed plates (312) are located underneath the flap (311) to serve as reinforcement while providing a configuration together with the flap (311) and the edge of the upper section of the ribbed plate (312) to facilitate the placement of the hasp holder (31) in relation to the bracket rod (22). A guide plate (32) is fixed to the hasp holder (31) and a chute (321) is disposed on the guide plate (32). The lever (21) stretches over and is fixed to the chassis (1). The retainers (5) are provided on the lever (21). A slot (33) is disposed on the battery case (3) to be engaged by the lever (21). Each hasp (4) is made in curved shape and pivotally connected to the battery case (3). A first end of the hasp (4) is a hook portion (41) having an outer slope (411) in relation to the retainer (5). A second end of the hasp (4) is pivotally connected to a first end of the connection rod (6). A second end of the connection rod (6) is disposed with a slide pin (61). The handle (7) is connected to the middle section of the slide pin (61). Both ends of the slide pin (61) respectively penetrate through their respective chutes (321). Both ends of the elastic member (8) are respectively connected to the second end of the hasp (4) and the battery case (3). A socket is disposed on the lever (21) and a plug is disposed to the battery case (3) for electric connection to the power source. The socket and the plug are not the essence of the present invention, and therefore they are not marked and will not be elaborated in the description.

Figure 3:
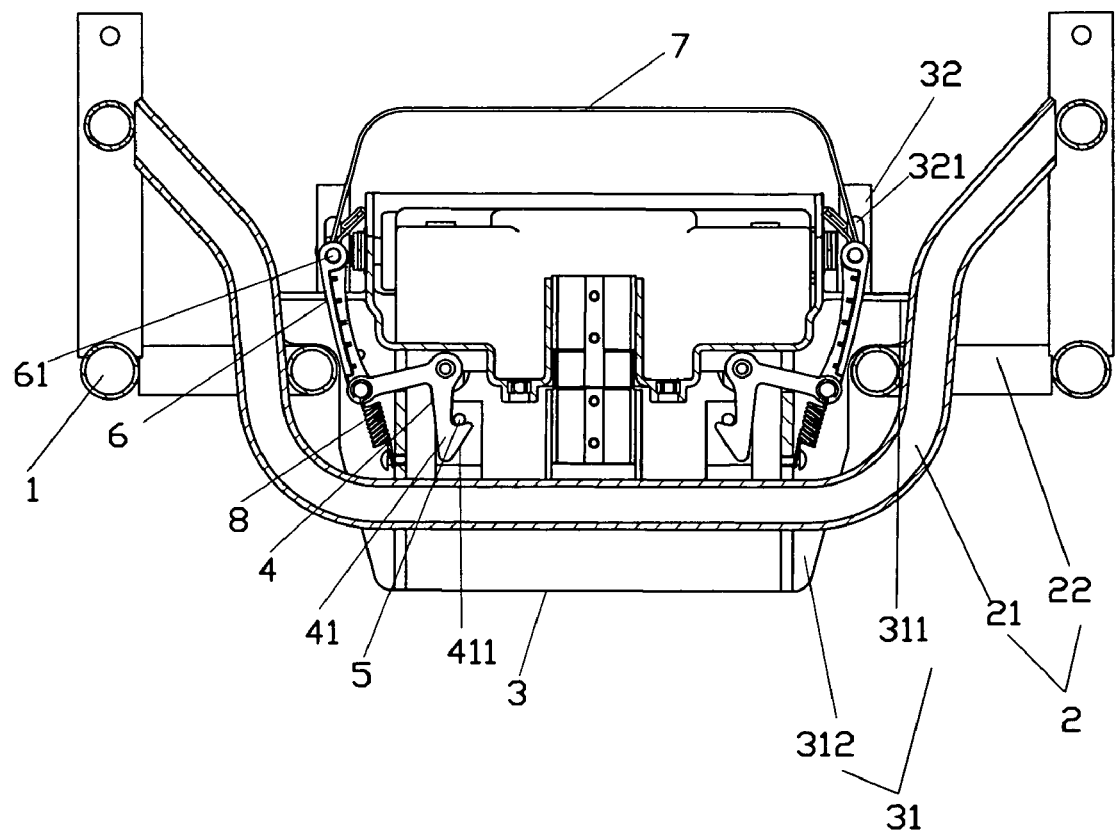
FIG. 3 is a side sectional view of the preferred embodiment of the present invention as assembled.

As illustrated in FIG. 2, while mounting the battery case (3) to the chassis (1), the outer slope (411) of the hook portion (41) is pressed in relation to the retainer (5). The force from the elastic member (8) causes the second end of the hasp (4) to be pulled down, resulting in that the hasp (4) pivots to the hook portion (41) to lock up the retainer (5) as illustrated in FIG. 3. Accordingly, the entire battery case (3) is secured to the chassis (1) without shaking up and down while the scooter is on the road. Meanwhile, the battery case (3) is firmly accommodated by the chassis (1) and the bracket rods (22) of the support unit (2), and the battery case (3) is further secured by having the slot (33) to ride on the lever (21).

Figure 4:
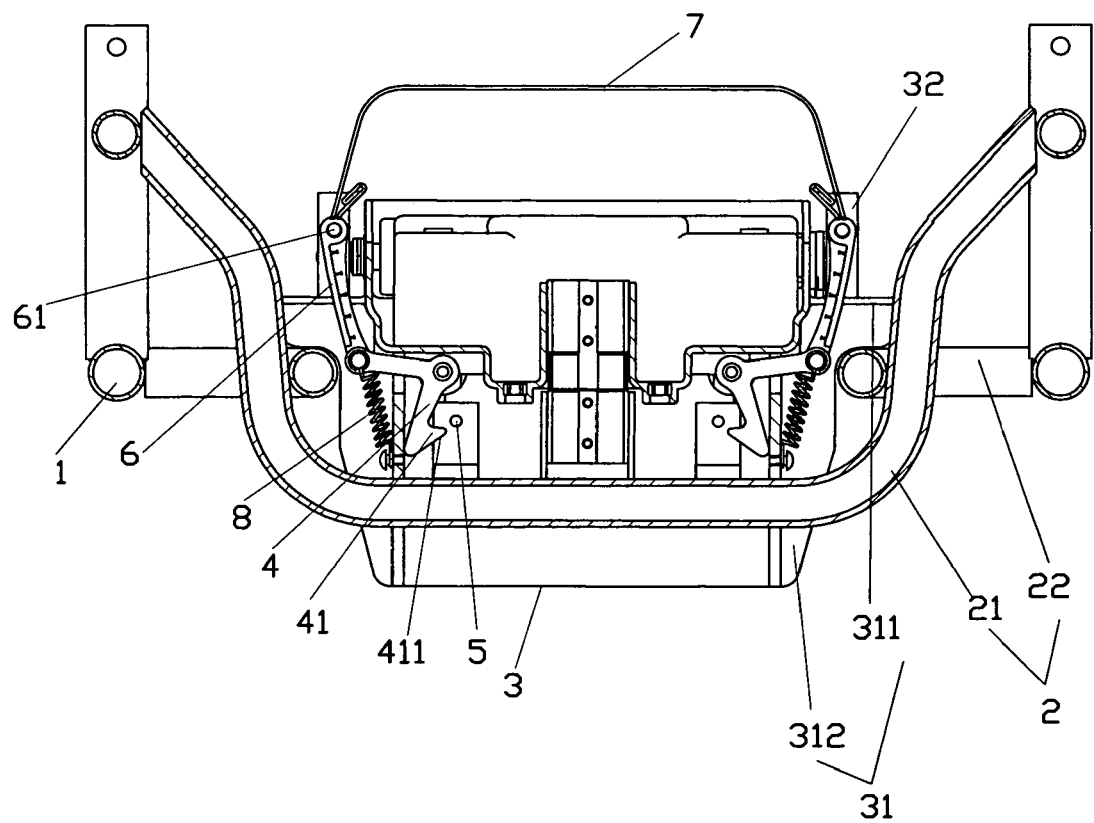
FIG. 4 is a side sectional view showing disassembling operation of the preferred embodiment of the present invention.

To remove the battery case (3) as illustrated in FIG. 4, simply pull up the handle (7) to raise the connection rods (6). The linked hasps (4) are turned to have the hook portions (41) of the hasps (4) retreat from the retainers (5).

Figure 5:
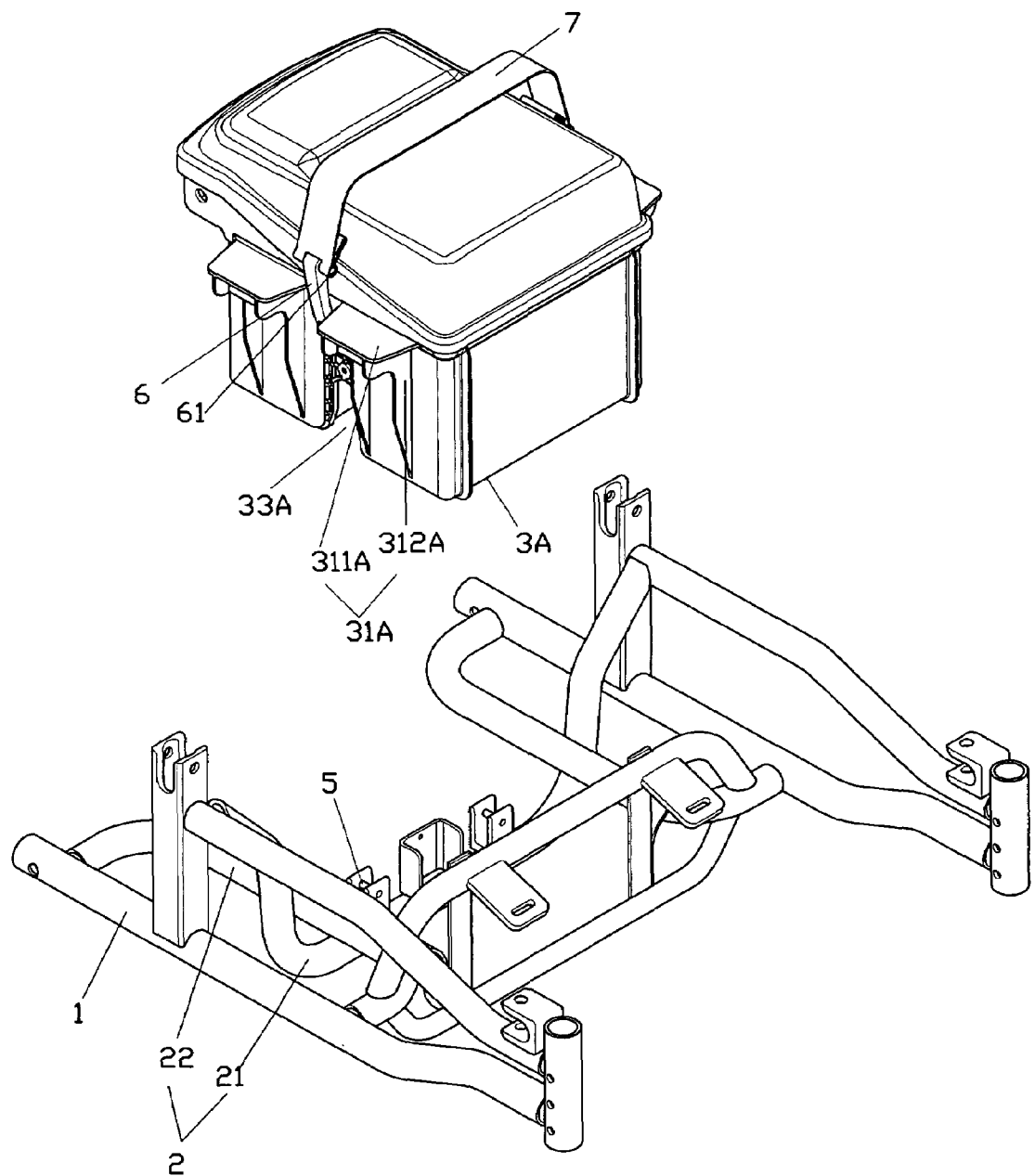
FIG. 5 is a perspective view of another preferred embodiment of the present invention.

Another preferred embodiment of the present invention, as illustrated in FIG. 5, includes the chassis (1), the support unit (2) having the lever (21) and the bracket rods (22), hasp holders (31A) of a battery case (3A) having a flap (311A) and ribbed plates (312A), a slot (33A), the retainers (5), the connection rods (6) with the slide pins (61) and the handle (7). In the second preferred embodiment of the present invention, the battery case (3A) can also be easily picked up by pulling up the handle (7) even with the absence of the guide plates (32) as provided in the first preferred embodiment of the present invention.

What is claimed is:

1. A battery quick-release structure for an electric mobility scooter comprising a chassis, a support unit, a battery case, hasps, retainers, connection rods, a handle, and elastic members; the support unit being fixedly connected to the chassis and comprising a lever and bracket rods, the bracket rods holding the edge of the battery case, the lever stretching over and being fixed to the chassis, the retainers being disposed on the lever, the battery case being disposed with a slot to engage with the lever, the hasp being made in curved shape and pivotally connected to the battery case, a first end of the hasp being a hook portion in relation to the retainer, a second end of the hasp being pivotally connected to a first end of the connection rod, a second end of the connection rod being connected to the handle, and both ends of the elastic member being respectively connected to the second end of the hasp and the battery case.

2. The battery quick-release structure for an electric mobility scooter of claim 1, wherein the second end of the connection rod is disposed with a slide pin to connect to the handle.

3. The battery quick-release structure for an electric mobility scooter of claim 1, wherein hasp holders further extend from both sides of the battery case to rest on the bracket rods of the support unit.

4. The battery quick-release structure for an electric mobility scooter of claim 3, wherein a guide plate is further fixed to each of the hasp holders; a chute being disposed on the guide plate; a slide pin being disposed on the second end of the connection rod, the slide pin penetrating through the chute.

5. The battery quick-release structure for an electric mobility scooter of claim 3, wherein each of the hasp holders comprises a flap and ribbed plates, the ribbed plates being located underneath the flap.

6. The battery quick-release structure for an electric mobility scooter of claim 1, wherein the hook portion of the hasp has an outer slope.

* * * * *